United States Patent
May et al.

(10) Patent No.: US 9,359,088 B2
(45) Date of Patent: Jun. 7, 2016

(54) LOW-G ALERT

(71) Applicant: EIT LLC, Sterling, VA (US)

(72) Inventors: Joe May, Leesburg, VA (US);
Christopher Murdock, Springfield, VA (US)

(73) Assignee: EIT LLC, Sterling, VA (US)

( * ) Notice: Subject to any disclaimer, the term of this patent is extended or adjusted under 35 U.S.C. 154(b) by 0 days.

(21) Appl. No.: 14/611,588

(22) Filed: Feb. 2, 2015

(65) Prior Publication Data

US 2015/0307204 A1 Oct. 29, 2015

Related U.S. Application Data

(60) Provisional application No. 61/941,557, filed on Feb. 19, 2014.

(51) Int. Cl.
| | |
|---|---|
| *B64D 45/00* | (2006.01) |
| *G01P 15/02* | (2013.01) |
| *G05D 1/08* | (2006.01) |
| *G01P 15/00* | (2006.01) |
| *G01P 15/08* | (2006.01) |

(52) U.S. Cl.
CPC ............. *B64D 45/00* (2013.01); *G01P 15/02* (2013.01); *G05D 1/0816* (2013.01); *G01P 15/00* (2013.01); *G01P 15/0891* (2013.01)

(58) Field of Classification Search
CPC ....... G01P 15/02; B64D 45/00; G05D 1/0816
USPC ............ 701/3, 4, 8, 9, 14; 340/963, 964, 967
See application file for complete search history.

(56) References Cited

U.S. PATENT DOCUMENTS

| | | | | |
|---|---|---|---|---|
| 4,635,030 A * | 1/1987 | Rauch | .................. | G05D 1/0055 340/519 |
| 4,763,285 A | 8/1988 | Moore et al. | | |
| 5,724,040 A * | 3/1998 | Watnick | .................. | G01S 7/003 342/26 D |
| 6,483,454 B1 * | 11/2002 | Torre | ...................... | G01S 13/76 342/29 |
| 6,879,263 B2 * | 4/2005 | Pederson | ............. | B60Q 1/2611 340/815.45 |
| 7,046,160 B2 * | 5/2006 | Pederson | ............. | B60Q 1/2611 340/815.45 |
| 8,290,641 B2 * | 10/2012 | Marstall | ................. | G01C 23/00 701/9 |
| 2006/0238368 A1 * | 10/2006 | Pederson | ............. | B60Q 1/2611 340/815.45 |
| 2007/0273556 A1 * | 11/2007 | Gyde | ..................... | G01C 23/00 340/945 |
| 2008/0136661 A1 * | 6/2008 | Pederson | ............. | B60Q 1/2611 340/815.45 |
| 2010/0250034 A1 * | 9/2010 | Bouchard | ............ | G07C 5/0825 701/14 |
| 2010/0299067 A1 * | 11/2010 | McCollough | ............ | G08G 5/04 701/301 |
| 2014/0027564 A1 * | 1/2014 | Mercer | ................... | B64C 27/57 244/17.13 |

OTHER PUBLICATIONS

Robinson Helicopter Company, Safety Notice SN-11. Issued Oct. 1982, revision Nov. 2000.

* cited by examiner

*Primary Examiner* — Russell Frejd
(74) *Attorney, Agent, or Firm* — Whitham, Curtis, Christofferson & Cook, P.C.

(57) ABSTRACT

A warning system alerts a helicopter pilot that a low-G condition is imminent or occurring. The low-G alert employs an accelerometer to detect a vertical acceleration of the aircraft. Higher frequency vibrations in the output of the accelerometer are removed by a filter to provide a clean signal representing vertical acceleration of the aircraft. This signal is processed by a central processing unit (CPU) to perform a threshold detector function. The CPU is configured to detect the possibility of the onset or occurrence of a low-G event. Upon detection, the CPU triggers an audible alert to announce "Low-G. Pull aft." or the like until the low-G event has been corrected or avoided.

18 Claims, 3 Drawing Sheets

LOW-G ALERT

CROSS-REFERENCE TO RELATED APPLICATIONS

This application claims the priority of U.S. Provisional Patent Application No. 61/941,557, filed Feb. 19, 2014, the complete contents of which are herein incorporated by reference.

BACKGROUND OF THE INVENTION

1. Field of the Invention

The present invention generally relates to safety instrumentation for rotary wing aircraft and, more particularly, to a warning system to alert the pilot of a low-G ("weightless") condition which, if not promptly corrected, can result in catastrophic failure of the aircraft.

2. Background Description

Rotary wing aircraft (i.e., helicopters) have a main rotor that has from two to four blades. Helicopters furthermore have a tail rotor or lateral force generator which provides a thrust counter to the counter rotation induced by the main rotor to maintain stable flight. The control of the main rotor by the pilot is achieved by a series of control rods that tilt and/or raise and lower a rotor swash plate which controls the angle of attack of the rotor blades. Similarly, the control of the tail rotor by the pilot is achieved by control rods that vary the pitch of the tail rotor blades. A helicopter has three basic separate control inputs and, in addition, a throttle control. The main controls are the Cyclic, the Collective, and the Anti-torque Pedals which control the thrust of the tail rotor. The Cyclic and Collective controls may be linked together so that the push rods, in combination, provide both Cyclic and Collective control of the main rotor.

The Cyclic is usually located between or adjacent to the pilot's legs. It is called the cyclic because it changes the pitch of the main rotor blades depending on their position as they rotate around the hub. The change in the Cyclic pitch has the effect of changing the angle of attack and thus the lift generated by each individual blade as it moves around the rotor swash plate. This in turn causes the blades to change angle of attack up or down in sequence, depending on the tilt of the rotor swash plate. If the rotor swash plate tilts forward, a thrust vector is produced in the forward direction. If the pilot pushes the cyclic stick to the right, the rotor swash plate tilts to the right and produces thrust in that direction, causing the helicopter to move sideways in a hover or to roll into a right turn during forward flight, much as in a fixed wing aircraft. Similarly, direction of flight to the rear and to the left is controlled by moving the Cyclic aft or to the left, respectively.

The Collective pitch control, or Collective, is normally located to the left of the pilot's seat. The Collective changes the pitch angle of all the main rotor blades at the same time independent of their position about the rotor swash plate and results in increases or decreases in total lift. In level flight, this would cause a climb or descent. With the helicopter pitched forward, an increase in total lift would produce an acceleration together with a given amount of ascent.

The Anti-torque Pedals are located in the same position as the rudder pedals in a fixed wing aircraft and serve the same purpose. Pressing the Anti-torque Pedals changes the pitch of the tail rotor blades, increasing or reducing the thrust produced by the tail rotor causing the nose of the helicopter to yaw in the direction of the applied pedal.

For cyclic control, small helicopters depend primarily on tilting the main rotor thrust vector to produce control moments about the aircraft center of gravity (CG), causing the helicopter to roll or pitch in the desired direction. Pushing the Cyclic control forward abruptly from either straight-and-level flight or after a climb can put the helicopter into a low-G flight condition. "Low-G" is sometimes referred to as "weightless" owing to the fact the pilot and passengers may feel a sense of weightlessness most often associated with free fall. "Low-G" is a well understood term in the art and generally refers to the airframe being temporarily partially or totally unloaded. During the low-G condition, lateral Cyclic has little, if any, effect because the rotor thrust has been reduced. In a counter-clockwise rotor system, there is no main rotor thrust component to the left to counteract the tail rotor thrust to the right, and since the tail rotor is above the CG, the tail rotor thrust causes the helicopter tail to rise and the entire aircraft to roll rapidly to the right. In a clock-wise rotor system, the effects are the reverse. If the pilot attempts to stop the right roll by applying full left (or right in a clockwise system) Cyclic before regaining main rotor thrust, the rotor can exceed its flapping limits and cause structural failure of the rotor shaft due to mast bumping, or it may allow a rotor blade to contact the airframe or the pilot may simply lose control.

The Federal Aviation Administration (F.A.A.) regards low-G conditions as being among the more significant flight risks to rotary wing aircraft operators. For this reason, a minimum of two hours of safety training on the subject is generally required before pilots are permitted to operate a Robinson helicopter, for example. The safety training traditionally places higher emphasis on avoidance of low-G conditions as opposed to the corrective maneuvers necessary to recover if a low-G event occurs. As discussed in Safety Notice SN-11 of the Robinson Helicopter Company, even highly experienced and skilled pilots suffer catastrophic/fatal accidents after entering low-G conditions, and thus avoiding low-G scenarios in the first place is viewed as the best approach to accident avoidance.

Despite the well-known severity of low-G conditions, most rotary wing aircraft do not have any system or device for detecting low-G conditions. In such cases, pilots may be advised that a "lightness in the seat of the pants" may be an indication that the aircraft is experiencing a low-G event. This "intuitive" approach to identifying low-G conditions is highly subjective and indefinite and arguably fails to provide any safety measure of real substance.

U.S. Pat. No. 4,763,285 to Moore et al. ("Moore") discloses a system which identifies low-G conditions in various bands of severity using an accelerometer. The system issues a warning signal to the helicopter pilot in the form of a warbling tone and a suitable warning light. A significant drawback to Moore is a failure to take into account the expected human response for correcting a low-G condition. In most cases, a pilot may have a matter of seconds (e.g., 1-2 seconds) to make a proper corrective maneuver to avoid a catastrophic accident once a low-G event is occurring. Rotary wing aircraft pilots do not frequently encounter low-G conditions and thus, despite the aforementioned safety training, often make a wrong corrective maneuver after becoming aware of low-G conditions per a system such as is disclosed by Moore. An intuitive response of the pilot to a low-G condition is often to apply left lateral Cyclic, the effects of which can be catastrophic. By the time a pilot deduces that he or she has made the wrong correction, an accident may already be occurring or unavoidable. Furthermore, generic auditory alerts such as warbling tones are commonly used for a plurality of purposes such as, for example, an autopilot disconnect. The seconds required for a pilot to identity the precise problem to which a generic auditory alert refers could exhaust the small window of time during which the aircraft is still recoverable from the low-G event. Systems which use visual light warnings such as in Moore are discouraged by the F.A.A., as they introduce a distraction in the cockpit which might only exacerbate the safety hazard or can be misinterpreted since there are other warning lights.

Accordingly, there is a continuing need for systems or devices which reduce the frequency of accidents associated with low-G conditions in rotary wing aircraft.

SUMMARY

It is therefore an object of the present invention to provide a warning system to alert a helicopter pilot that a low-G condition is imminent or occurring, and furthermore to provide audible instructions to the pilot on appropriate corrective action to obviate the low-G condition.

Pilots are advised that if they find themselves in a low-G condition, they should immediately and smoothly apply aft Cyclic and not to attempt to correct immediately for rolling action with application of left (lateral) Cyclic. By applying aft Cyclic, the rotor system will be re-loaded which in turn produces thrust. Once thrust is restored, lateral cyclic control becomes effective. However, if the helicopter is still pitching forward when the pilot applies left cyclic, the rotor disc may tilt aft relative to the fuselage before it is reloaded. The main rotor torque reaction will then combine with the tail rotor thrust to produce a powerful rolling movement on the airframe. The condition is so dangerous that even a skilled pilot is at serious risk of harming the aircraft and himself or herself.

According to an aspect of the invention, there is provided a low-G alert for rotary wing aircraft which employs an accelerometer to detect vertical acceleration of the aircraft. Higher frequency vibrations in the output of the accelerometer are removed by a filter to provide a clean signal representing vertical acceleration of the aircraft. This signal is processed by a central processing unit (CPU) to perform a threshold detector function. The CPU is configured to detect the onset of a low-G event. Upon detection of the occurrence or possibility of a low-G event, the CPU causes an alert which includes notification that a low-G event is imminent or occurring and audible instructions for corrective action (e.g., announcing "Low-G. Pull aft.") repeatedly until the low-G event has been corrected or avoided.

The CPU is preferably configured to provide the warning to the pilot prior to full development of a low-G condition actually occurring so that the pilot has sufficient time to take necessary corrective action.

BRIEF DESCRIPTION OF THE DRAWINGS

The foregoing and other objects, aspects, and advantages will be better understood from the following detailed description of a preferred embodiment of the invention with reference to the drawings, in which.

DETAILED DESCRIPTION

Figure 1:
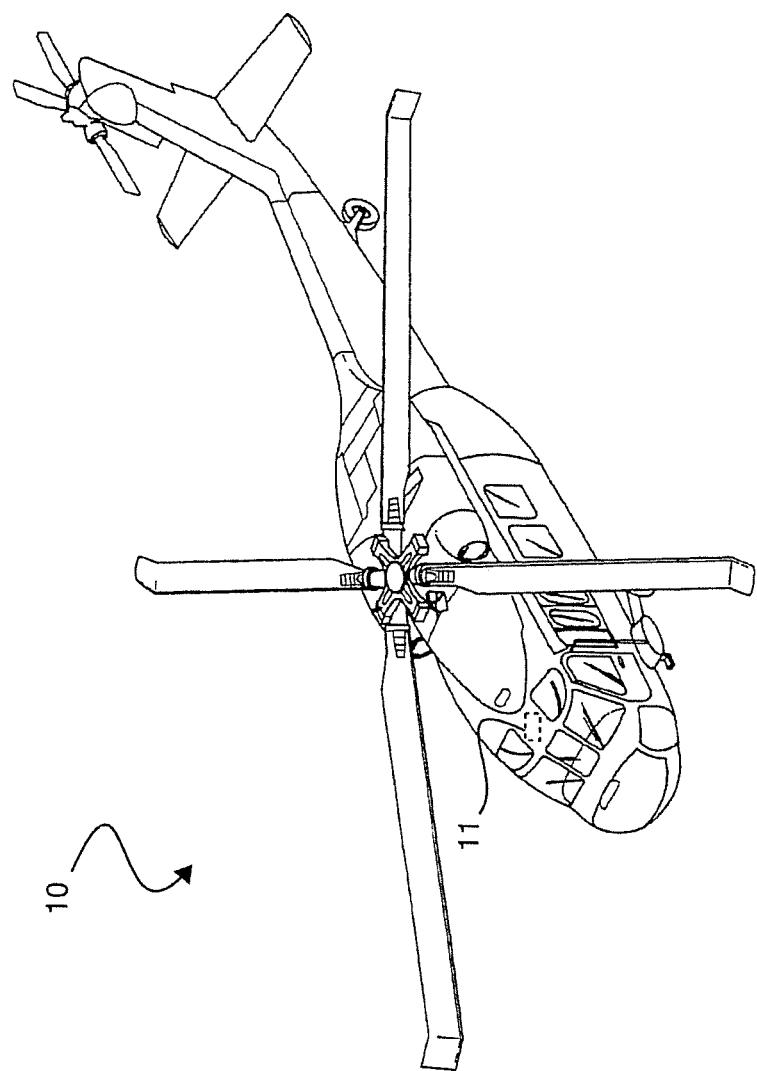
FIG. 1 is a helicopter fitted with a low-G alert.

Referring now to the drawings, and more particularly to FIG. 1, a rotary wing aircraft 10 is equipped with a low-G alert 11, shown schematically inside the helicopter 10. According to an exemplary embodiment, a low-G alert 11 may be built into a helicopter 10 at the time the aircraft is manufactured. According to another exemplary embodiment, an existing helicopter 10 may be retrofitted to include the low-G alert 11. Retrofitting of a helicopter 10 may consist of or include adding additional components to the helicopter which are part of low-G alert 11 (see FIG. 2) and/or configuring existing components already installed in the helicopter 10 for use as part of the alert 11.

Figure 2:
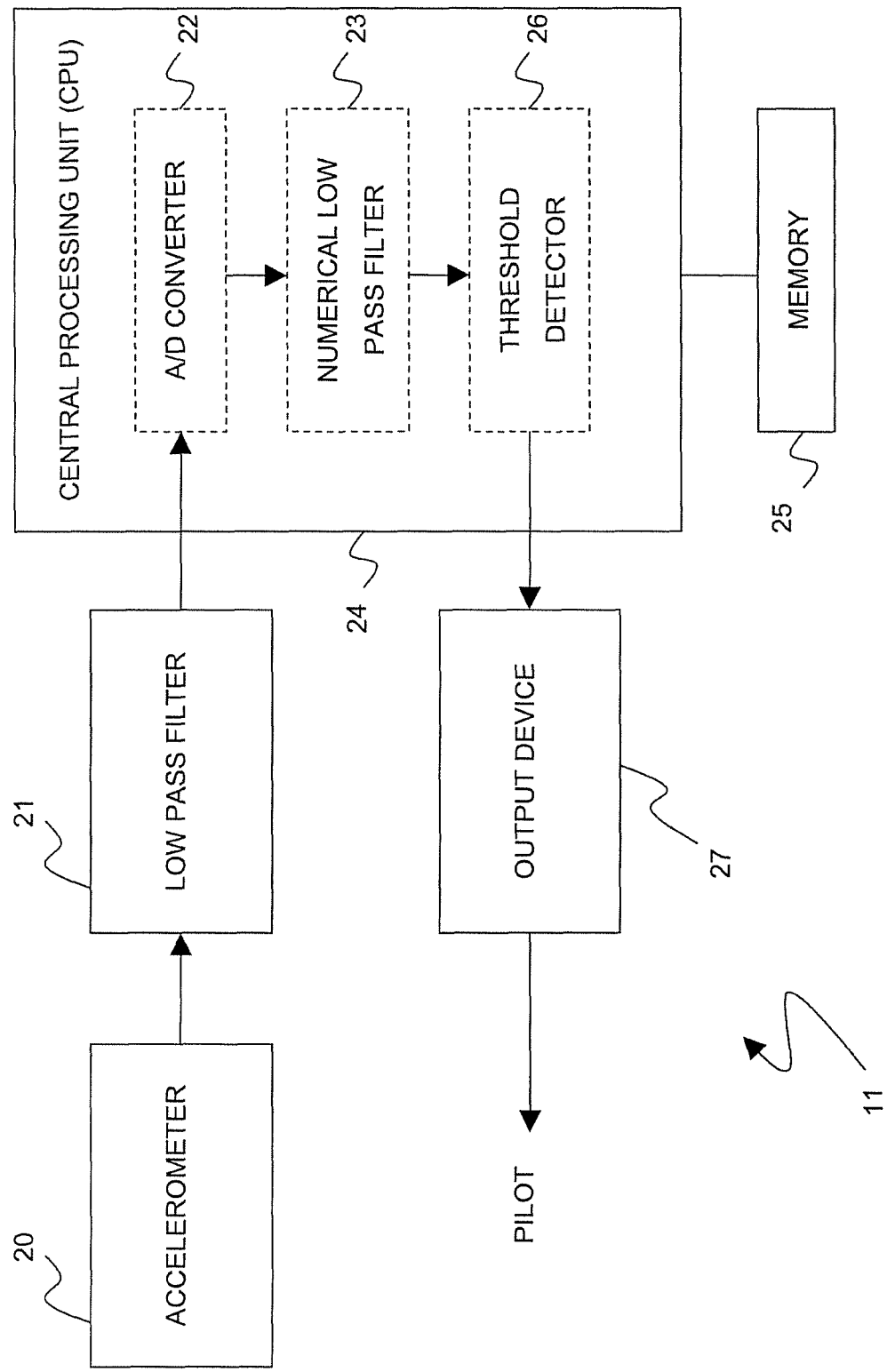
FIG. 2 is a block diagram of an exemplary low-G alert according to the invention.

FIG. 2 shows schematically a low-G alert 11. The low-G alert 11 comprises at least one accelerometer 20 that detects/senses vertical acceleration of the rotary wing aircraft 10. It is advantageous although not mandatory that the accelerometer 20 be arranged at or as near as possible to a center of gravity (CG) of the helicopter 10. The accelerometer 20 is generally an analog device and outputs an analog signal. Alternatively, an accelerometer 20 may be used that includes circuitry for analog-to-digital conversion, in which case the vertical accelerometer may output a digital signal. It is noted that any suitable accelerometer may be used for accelerometer 20, provided it is configurable or configured for detecting vertical acceleration (i.e., acceleration substantially parallel/anti-parallel to Earth's gravitational pull on the helicopter 10).

It is expected that the initial electrical signal or signals of the accelerometer 20 containing vertical acceleration information will contain some amount of signal content which is not indicative of vertical acceleration of the airframe (i.e., the signal contains some amount of noise). Generally, such initial signals are filtered by a low-pass filter 21. Low-pass filter 21 may be separate from or incorporated into the accelerometer 20. If desired, other routine circuit elements may be included such as, for example, an amplifier (not shown) to increase the signal strength of the output of the accelerometer 20. The analog signal filtering required is intended to prevent aliasing of an analog accelerometer signal. For embodiments where the signal output from the accelerometer is analog, the filtered analog signal from the low pass filter 21 is converted to a digital representation by an analog-to-digital (A/D) converter 22. As previously discussed, this may be also be incorporated into the accelerometer 20 to achieve a digital output directly from the sensor. The resulting digital representation of the vertical acceleration of the helicopter 10 may be subjected to further low pass filtering in a digital filter such as low pass filter 23. The function of low pass filter 23 is implemented using recursive numerical or similar digital filtering. This filtering is generally required or at least highly desirable to remove mechanical artifacts such a rotor sounds, engine vibrations, and the like. It is important to choose a low pass filter which will accept the low-G impulse but reject the mechanical artifacts. For example, an exemplary low-pass filter cutoff frequency for low-G is about 1.5 Hz.

According to some embodiments, analog-to-digital converter 22 and low pass filter 23 are both implemented as part of a processor 24, as is shown schematically in FIG. 2. The processor 24, which may be a commercially available central processing unit (CPU), is configured to perform a thresholding function. More specifically, the processor 24 is configured to compare the live feed of vertical acceleration information from the accelerometer 20 to a predetermined/predefined threshold value. The threshold value may be stored on memory such as, for example, non-volatile storage medium 25, from which the processor 24 is able to retrieve the threshold value and any other digitally stored information as needed. The threshold detector 26 of the processor 24 is configured to detect when the vertical acceleration of the helicopter 10 reaches or exceeds the predetermined threshold. The threshold is selected so as to indicate an imminent or occurring low-G event. The predetermined threshold used by the threshold detector 26 may define an imminent or occurring low-G event as the helicopter experiencing a downward vertical acceleration having a magnitude of less than 1.0 G, 0.9 G or less, 0.8 G or less, 0.7 G or less, 0.6 G or less, 0.5 G or less, 0.4 G or less, or even 0.3 G or less. Preferably, a low-G event is defined as occurring when downward vertical acceleration is 0.5 G or less. More preferably, a low-G event is defined as occurring when downward vertical acceleration is 0.3-0.5 G. It is desirable wherever possible to detect a potential low-G event and provide warning to the pilot prior to the low-G condition actually occurring so that the pilot has sufficient time to take necessary corrective action. As used herein, signal processing means may refer to any combination or all of low pass filter 21, A/D converter 22, low pass filter 23, threshold detector 26, processor 24, and/or any other signal processing circuit elements.

After the threshold detector 26 detects the vertical acceleration signal as meeting or exceeding the predefined threshold, the processor 24 provides a signal to an output device 27 that supplies an alert message to the pilot of the helicopter 10. The alert message identifies the low-G event and, importantly, provides audio instructions of one or more corrective actions or maneuvers to the low-G event for the pilot to take to avoid an accident. The output device 27 is generally an annunciator or speakerphone such as is part of the intercom of the helicopter 10 or the headphones worn by the pilot. It is important that the audio instructions clearly state the corrective action desired of the pilot. In an exemplary embodiment, the audio instructions are a worded message instructing the pilot to pull the helicopter Cyclic aft. For example, the output device might announce at least "Low-G" and "Pull aft" to the pilot. The instructions (e.g., "Low-G. Pull aft." or "Low-G. Gently pull aft.") may be repeated until the low-G event has been corrected or avoided as determined by the processor 24. The audio instructions may be in the form of a prerecorded message stored on, for example, memory 25. Alternatively, data stored in memory 25 indicative of the worded message may be processed by a voice synthesizer of the processor 24 before being output by output device 27.

Figure 3:
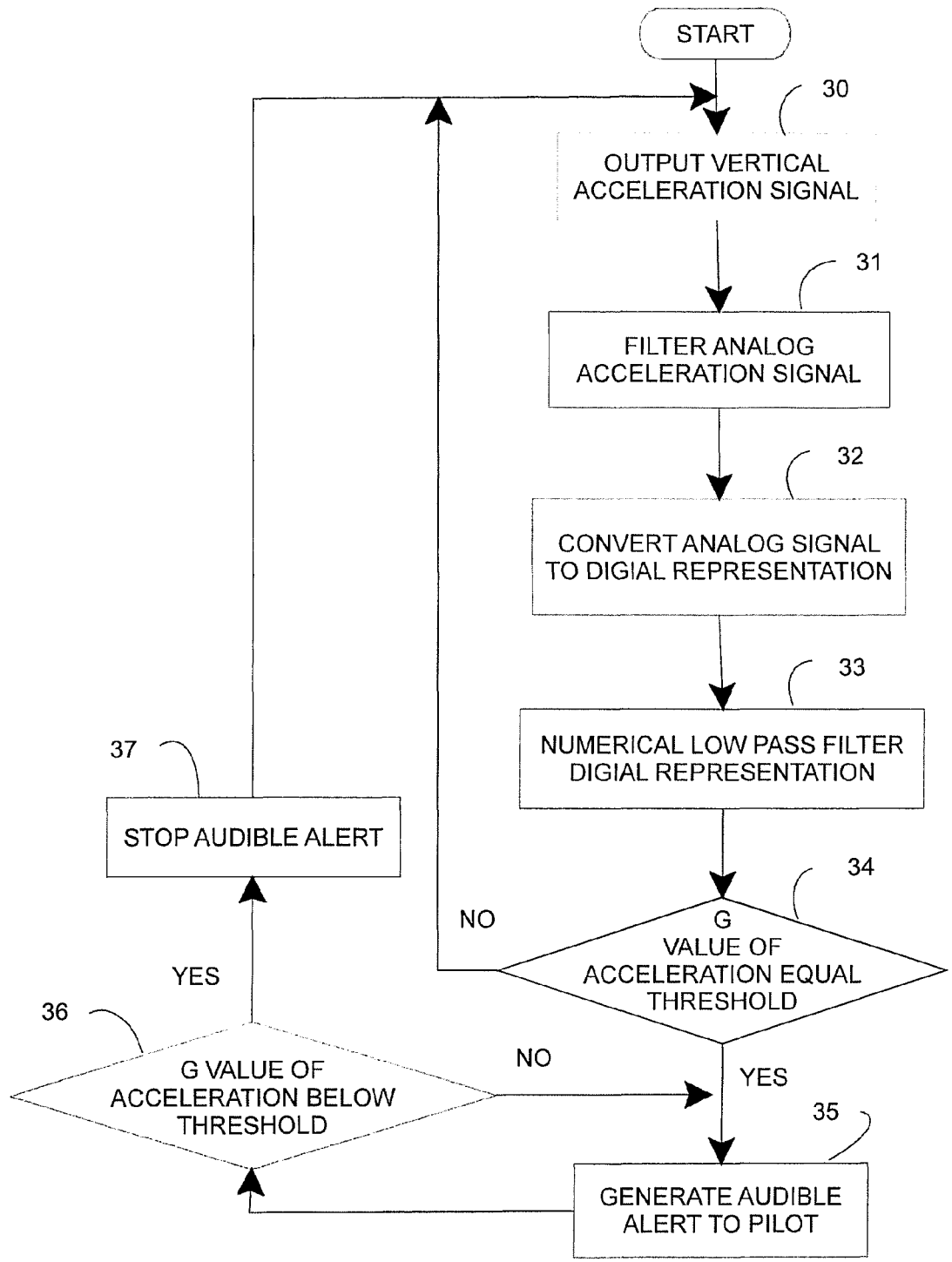
FIG. 3 is a flow diagram illustrating the operation of the low-G alert.

FIG. 3 is a flow diagram illustrating the process performed by an exemplary low-G alert according to the invention. The process begins at function block 30 where the vertical acceleration signal is generated. This analog signal is filtered at function block 31 and then converted to a digital representation at function block 32. This digital representation is subjected to numerical low pass filtering in function block 33. Then, in decision block 34, a determination is made as to whether the magnitude of the G value of vertical acceleration is equal to or exceeds a predetermined threshold. If not, the process returns to function block 30; however, if the G magnitude of vertical acceleration equals or exceeds the predetermined threshold value, an audible alert containing instructions to the pilot is generated at function block 35. This audible alert preferably continues until the low-G condition is corrected or avoided. This is determined in decision block 36 where a determination is made as to whether the magnitude of the G value of vertical acceleration is below the predetermined threshold. If not, the process returns to function block 35, but if so, the audible alert is stopped in function block 37. The process then returns to function block 30.

The invention is a significant safety instrument for rotary wing aircraft providing the pilot with adequate warning of an approaching or immediate low-G condition. With this warning, the pilot may make the necessary corrections to avoid a catastrophic condition.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A low-G alert for rotary wing aircraft, comprising:
   at least one accelerometer for sensing a vertical acceleration of the rotary wing aircraft;
   signal processing means including a threshold detector detecting when the vertical acceleration reaches or exceeds a predetermined threshold that indicates an imminent or existing low-G event; and
   an output device which provides
      i) an indication that a low-G event is imminent or occurring, and
      ii) audio instructions of one or more corrective maneuvers for the pilot to take specific to and only for escaping the low-G event.

2. The low-G alert of claim 1, wherein the output device provides audio instructions to pull the rotary wing aircraft Cyclic aft.

3. The low-G alert of claim 1, wherein the output device includes one or more headphones or speakers which announce at least "Low-G" and "Pull aft" to the pilot.

4. The low-G alert of claim 1, wherein the signal processing means further comprises one or more low pass filters reducing or removing frequencies from mechanical vibrations of the rotary wing aircraft in one or more signals from the one or more accelerometers, a filtered output of the one or more low pass filters being received by the threshold detector for analysis of the vertical acceleration.

5. The low-G alert of claim 4, wherein the one or more low pass filters includes one or more of an analog filter and a digital filter.

6. The low-G alert of claim 1, wherein the signal processing means includes at least one processor configured to serve as the threshold detector by comparing signal values originating from the one or more accelerometers to stored data values representative of the predetermined threshold.

7. The low-G alert of claim 1, wherein the predetermined threshold used by the threshold detector defines the imminent or occurring low-G event as the rotary wing aircraft experiencing a downward vertical acceleration of 0.5 G or less.

8. The low-G alert of claim 7, wherein the low-G event is defined as the rotary wing aircraft experiencing a downward vertical acceleration of 0.3-0.5 G.

9. The low-G alert of claim 1, wherein the output device is configured to provide the audio instructions in the form of a prerecorded message.

10. The low-G alert of claim 1, further comprising a voice synthesizer for providing the audio instructions.

11. A method of alerting a pilot of a rotary wing aircraft of an imminent or occurring low-G event, comprising steps of:
   sensing a vertical acceleration of the rotary wing aircraft with at least one accelerometer;
   detecting when the vertical acceleration reaches or exceeds a predetermined threshold that indicates an imminent or occurring low-G event; and
   providing with an output device
      i) an indication that a low-G event is imminent or occurring, and
      ii) audio instructions of one or more corrective maneuvers for the pilot to take specific to and only for escaping the low-G event.

12. The method of claim 11, wherein the step of providing gives audio instructions to pull the rotary wing aircraft Cyclic aft.

13. The method of claim 11, wherein the step of providing announces at least "Low-G" and "Pull aft" to the pilot using one or more headphones or speakers.

14. The method of claim 11, wherein the predetermined threshold used in the step of detecting defines the imminent or occurring low-G event as the rotary wing aircraft experiencing a downward vertical acceleration of 0.5 G or less.

15. The method of claim 14, wherein the low-G event is defined as the rotary wing aircraft experiencing a downward vertical acceleration of 0.3-0.5 G.

16. The method of claim 11, wherein the step of providing provides the audio instructions in the form of a prerecorded message.

17. The method of claim 11, wherein the step of providing provides the audio instructions using a voice synthesizer.

18. The method of claim 11, further comprising a step of reducing or removing frequencies from mechanical vibrations of the rotary wing aircraft in one or more signals from the one or more accelerometers, a filtered output of the one or more low pass filters being used in the step of detecting.

* * * * *